United States Patent [19]

Hart

[11] 4,228,861

[45] Oct. 21, 1980

[54] FOLDING TRACK REMOVING IMPLEMENT

[76] Inventor: Thomas E. Hart, P.O. Box 81, Lee, Ill. 60530

[21] Appl. No.: 63,103

[22] Filed: Aug. 2, 1979

[51] Int. Cl.³ .................... A01B 73/00; A01B 37/00
[52] U.S. Cl. .................... 172/662; 172/445; 172/446; 172/605; 172/676
[58] Field of Search ............ 172/126, 127, 128, 130, 172/132, 134, 255, 311, 445, 456, 467, 605, 662, 676, 680, 446; 56/228, 385; 111/7

[56] References Cited

U.S. PATENT DOCUMENTS

| 368,787 | 8/1887 | Shields | 56/385 |
|---|---|---|---|
| 604,339 | 5/1898 | Rowe | 172/456 X |
| 751,314 | 2/1904 | Lindgren | 172/656 |
| 1,358,650 | 11/1920 | Pendleton | 172/676 X |
| 1,604,721 | 10/1926 | Riepe | 172/676 |
| 1,707,410 | 4/1929 | Neusiis | 172/676 |
| 1,917,944 | 7/1933 | Langdon | 172/676 X |
| 2,187,380 | 1/1940 | Kaltoft | 172/680 X |
| 2,277,880 | 3/1942 | Noble | 172/134 |
| 2,321,464 | 6/1943 | Cook | 172/676 X |
| 2,533,150 | 12/1950 | Steffen | 172/676 X |
| 2,675,752 | 4/1954 | Wangsgard | 172/676 X |
| 2,748,686 | 6/1956 | Nelson et al. | 172/128 |
| 2,795,180 | 6/1957 | Christofferson | 172/128 |
| 2,847,923 | 8/1958 | Bullard | 172/130 |
| 3,021,905 | 2/1962 | Quibell | 172/127 |
| 3,122,210 | 2/1964 | French | 172/456 |
| 3,156,306 | 11/1964 | Dunker | 172/456 |
| 3,180,429 | 4/1965 | Perhink | 172/456 |
| 3,536,144 | 10/1970 | Hood et al. | 172/311 |
| 3,830,313 | 8/1974 | Frager et al. | 172/311 X |
| 4,014,271 | 3/1977 | Rohlf et al. | 111/7 |
| 4,047,575 | 9/1977 | Wagner | 172/311 |
| 4,120,365 | 10/1978 | Kuhn | 172/676 X |

FOREIGN PATENT DOCUMENTS 306034 2/1933 Italy ........................ 172/134

OTHER PUBLICATIONS

"K & M Wheel-Trac Mulcher", K and M Mfg., Renville, Minn., Aug. 31, 1979.

Primary Examiner—Richard T. Stouffer
Attorney, Agent, or Firm—Hill, Van Santen, Steadman, Chiara & Simpson

[57] ABSTRACT

A folding implement mountable on the three-point hitch of a tractor has a U-shaped, downwardly oriented, central member with a horizontal wing extending laterally from each side of the central member, behind the rear wheels of the tractor. Each horizontal wing has a series of downwardly extending tines spaced thereon. The tines score the earth behind each tractor wheel when the wings are horizontal. A lifting mechanism affixed to the wings and the tractor rotates the wings vertically each time the three-point hitch is raised so that the implement is folded out of the way when turning the tractor.

23 Claims, 9 Drawing Figures

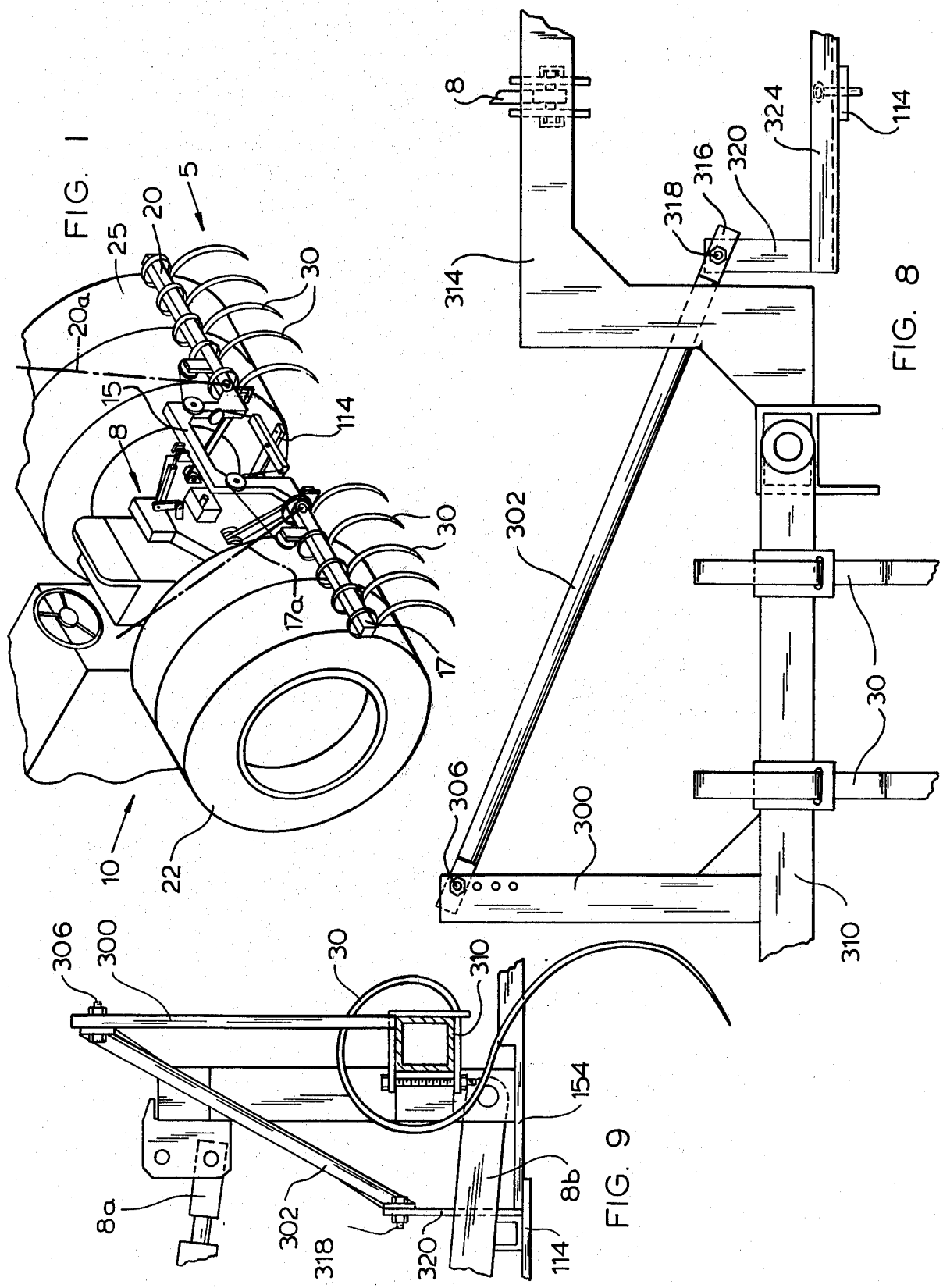

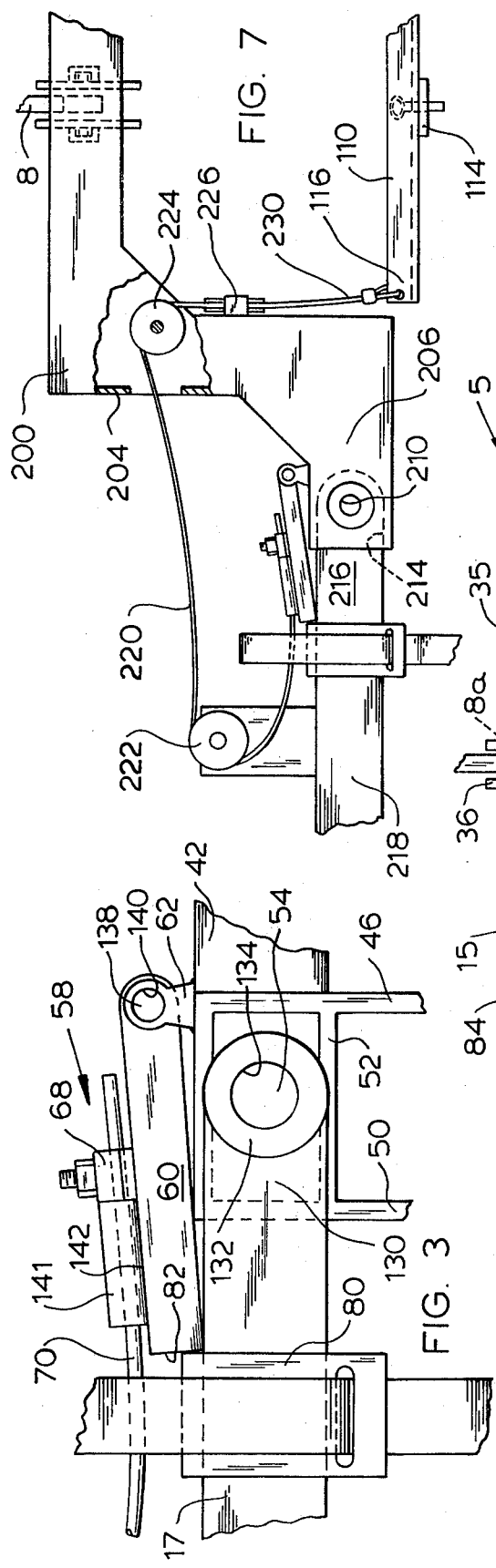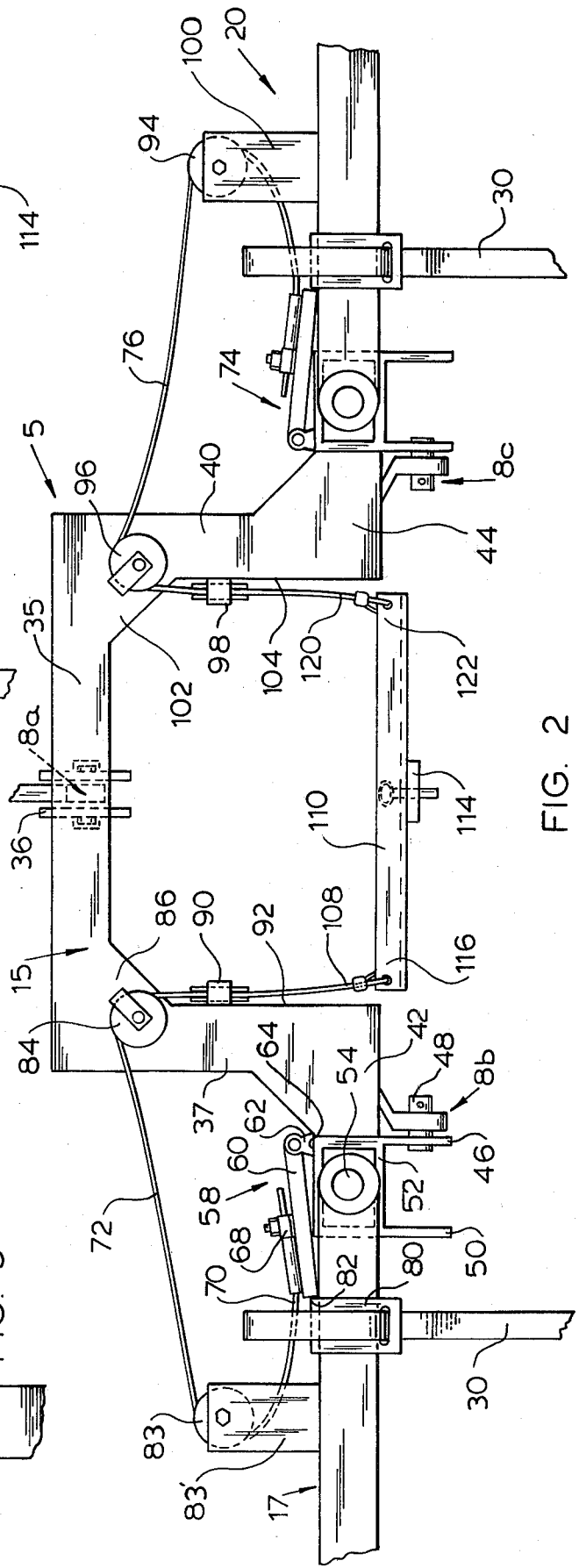

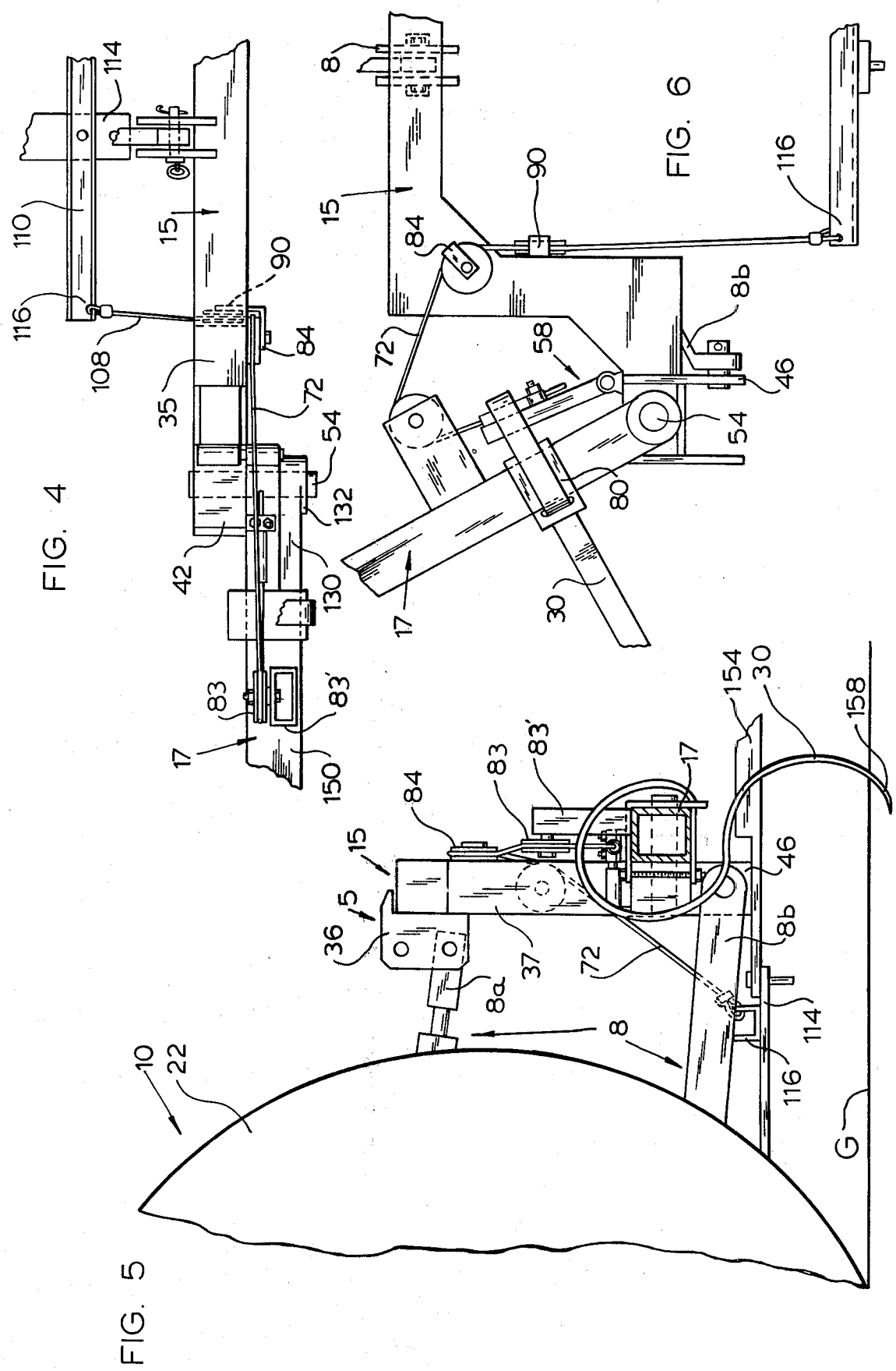

FOLDING TRACK REMOVING IMPLEMENT

BACKGROUND OF THE INVENTION

1. Field of the Invention

The invention pertains to the field of tractor mounted farm implement.

2. The Prior Art

Tractor mounted farm implements with two horizontal wings having tines that dig into and score the earth to remove wheel tracks made by the tractor are known in the art. Examples may be found in U.S. Pat. Nos. 2,321,464; 2,675,752 and 4,120,365. The apparatus of each of the above identified patents is connected to the rear of a tractor and is movable vertically from a lower ground engaging position to an upper position. In its upper position the apparatus of the above identified patents do not score the earth.

The apparatus of the above identified patents have the undesirable feature that when the tractor is pulling another implement, such as a wagon, the horizontal wings of the apparatus tend to interfere with the ability of the tractor to make short radius turns without running the wings of the track removing apparatus into the second implement being pulled.

Thus, there has been an unfilled need for a track removing apparatus which will not interfere with the ability of the tractor to make short radius turns while pulling an additional implement.

SUMMARY OF THE INVENTION

The invention comprises an improved track removing implement mountable onto the three-point hitch of a tractor. The implement has a U-shaped, downwardly oriented, central member with a pivotably mounted, horizontally extending wing attached to each side of the central member.

Each horizontal wing extends laterally with respect to the tractor and behind one of the rear, single or double, tractor wheels. Tines attached to each wing engage the ground when the wings are horizontal and score the compressed ground removing the wheel tracks left by the tractor.

A cable, or two-part rigid member, associated with each wing has one end attached to a fixed point on the tractor, and the other attached to the wing. The cable, or two-part rigid member, rotates its associated wing from the horizontal to a vertical position whenever the three-point hitch is raised. When the hitch is lowered, the wings return to their horizontal position.

A lock affixed to each wing mechanically holds that wing rigidly in a horizontal position when a cable is used to rotate the wing to its vertical position.

BRIEF DESCRIPTION OF THE DRAWINGS

FIG. 1 is a perspective view of the inventive implement attached to a partially broken away tractor.

FIG. 2 is a rear elevational view with the wings of the inventive implement partially broken away.

FIG. 3 is an enlarged partial view showing the means for locking the inventive implement.

FIG. 4 is a top elevational view showing a partially broken away portion of one wing and the central supporting member.

FIG. 5 is a side view of the inventive implement with the tractor and a second implement partially broken away.

FIG. 6 is a partial rear elevational view showing a partly broken away wing in a substantially vertical position.

FIG. 7 is a rear elevational view of a second embodiment of the invention with a partially broken away wing.

FIG. 8 is a rear elevational view of a third embodiment of the invention with a partially broken away wing.

FIG. 9 is a side elevational view, partially broken away, of the third embodiment of FIG. 8.

DETAILED DESCRIPTION OF THE PREFERRED EMBODIMENTS

Not by way of limitation but by way of disclosing the best mode of practising my invention and by way of enabling one of ordinary skill to practise my invention there are shown in FIGS. 1 through 9 several embodiments of my invention.

An exemplary embodiment of my invention is shown in FIG. 1 as a folding implement 5 attached to three-point hitch 8 of a tractor 10. The three-point hitch 8 has members 8a, b, c that can move vertically upward down under driver control. The implement 5 has a central member 15 attached to the three-point hitch 8. To each side of the central member 15 is, rotatably attached an elongated rigid wing 17, 20. Each wing 17, 20 is oriented transversely to the tractor and is positioned, substantially horizontally, behind a rear wheel or wheels 22, 25 of the tractor 10.

To each horizontally extending wing 17, 20 is affixed a plurality of elongated spring-like tines 30. Each of the tines 30 has a conventional shape, as is well known in the art, and forms no part of my invention. The lower end of each of the tines 30 extends into and scores the earth behind each of the tractor wheels 22, 25 thereby removing the tracks of the wheels 22, 25 from the field when the wings 17, 20 are horizontal.

When the three-point hitch 8 is moved from a lower position to an upper position a means for rotating pivots each wing 17, 20 from the substantially horizontal position to a substantially vertical position, indicated at 17a, 20a in phantom, in FIG. 1. With the wings 17, 20 in the substantially vertical position 17a, 20a the tractor 10 may make short radius turns without the wings 17, 20 striking another implement being pulled by the tractor 10.

FIG. 2 a rear planar view shows the implement 5 in greater detail. The central member 15 is U-shaped and downwardly oriented with a horizontal section 35 and a pair of side arms 37, 40. Each arm 37, 40 has respective termination members 42, 44 affixed thereto.

The termination members 42, 44 are identical and a description of the member 42 will also describe the member 44. The member 42 has a vertical flange 46 which is pivotably attached by a pin 48 to member 8b of the three-point hitch 8. A second, smaller, spaced-apart flange 50 is affixed at the end of the termination member 42. A horizontal reinforcing member 52 is located between the flanges 46, 50. The vertical flange 50 supports the wing 17 when the wing 17 is substantially horizontal.

A pin 54 attached to the termination 42 in any conventional fashion, such as by welding, provides a pivot point around which the wing 17 rotates. A means for locking 58 has an elongated plate 60 which pivots about a member 62. The member 62 is affixed to a top surface 64 of the termination 42. A cable clamp 68 retains an end 70 of a lifting cable 72 on the means for locking 58.

Associated with the termination member 44 is a second means for locking 74 and a corresponding cable 76. The cable 76 may be a separate cable or may be of a portion of the cable 72.

The wing 17 has a retaining block 80 affixed thereto, in any conventional fashion, adjacent a surface 82 of the plate 60. A tine 30 may be affixed to the block 80 if desired. The locking means 58 interacts with the block 80 to hold the wing 70 in a substantially horizontal position as the tractor 10 rolls across the field with the tines 30 engaging the ground and eliminating the marks of the wheels 22, 25.

The cable 72 is guided by a pulley 83 rotatably mounted on an upward extending flange 83′, a pulley 84 which is mounted on a rear surface 86 of the U-shaped downwardly extending central member 15 and a third pulley 90 which is mounted on an inside surface 92 of the side member 37 of the U-shaped central member 15. An identical set of three pulleys 94, 96, 98 mounted analogously on a flange 100, a surface 102 and a surface 104 function to guide the cable 76.

An end 108 of the cable 72 is affixed to a bar member 110 which is rigidly attached to a rearwardly extending draw bar 114 which is attached to a lower rear section of the tractor 10. The draw bar 114 which extends axially rearwardly of the tractor 10, is a fixed point on the tractor 10 with respect to the three-point hitch 8 which moves substantially vertically with respect to the draw bar 114. An additional implement may be connected to the draw bar 114 and drawn by the tractor 10. The end 108 of the cable 72 is connected to an end 116 of the rigid bar 110 in any conventional fashion. Similarly, an end 120 of the cable 76 is connected to an end 122 of the rigid bar 110.

As may be observed from FIG. 2, when the three-point hitch 8 is caused to move vertically by the operator of the tractor 10, the downwardly oriented U-shaped member 15 moves upward. As the member 15 starts to move upward, the two cables 72, 76 are drawn tight due to the fact that one end of each cable 108, 120 is attached to the fixed point 110 of the tractor 10. As the cables 72, 76 are drawn tight, the means for locking 58, 74 are caused to pivot slightly such that the surface 82 of the plate 60 of the means for locking 58 no longer engages the locking block 80 on the wing 17. As a result, the wings 17 and the wing 20 are unlocked and free to rotate to a substantially vertical position before the cables 72 and 76 are drawn so tight that a rotating force is exerted on the wings 17, 20. As the force on the cables 72, 76 is increased, the cables 72, 76 acting through the pulleys 83, 94 respectively, start to rotate the wings 17, 20, respectively, from the substantially horizontal position as shown in FIG. 2 to the substantially vertical position as indicated by 17a, 20a in FIG. 1. When the three-point hitch 8 has reached the bottom or lower point of its vertical movement, the wings 17, 20 have moved into the position 17a, 20a, respectively. In the substantial vertical position the wings 17, 20 are folded upwardly out of the way so that they will not engage a second implement being drawn by the tractor 10 on the draw bar 14.

When the operator of the tractor 10 lowers the three-point hitch 8 from its upper position toward its lower position the cables 72, 76 are loosened and in conjunction with the pulleys 83, 94 which are affixed to the wings 17, 20 respectively, by the flanges 83′, 100, permit the wings 17, 20 to return to an essentially horizontal position whereat the means for locking 58, 74 reengage the wings 17, 20 holding them in that position until the three-point hitch 8 is again raised.

FIG. 3, an enlarged fragmentary view, shows the detail of the means for locking 58 which is identical to the detail of the means for locking 74. The horizontal termination member 42 of the vertical side member 37 of the U-shaped central member 15 is shown with the rotating pin 54 attached thereto and with the supporting flange 50 supporting the wing 17 in a horizontal position. An end 130 of the wing 17 has an enlarged circular region 132 with a boring 134 therein. The boring 134 receives the pin 54 attached to the terminating member 42. As the wing 17 is raised by the cable 72 the pin 54 permits the wing 17 to rotate and coacts with the boring 134.

Associated with the means for locking 58 is a pin 138 which engages a boring 140 of the member 62 attached to the terminating member 42. The end 70 of the cable 72 is received in a sleeve 141 attached to an upper surface 142 of the plate 60. The end 70 of the cable 72 is retained within the sleeve 141 in any conventional fashion such as by the cable clamp 68 adjacent the sleeve 141.

FIG. 4, a top view with the wing 17 partially broken away, shows the relationship of the cable 72 to the wing 17 and to the fixed point 110 on the tractor 10. The cable 72 is guided by the pulleys 83, 86, 90. The pulley 83 is attached to the vertical supporting post 83′ which is affixed to a top surface 150 of the wing 17. The main rotating pin 54 on which the wing 17 rotates is shown engaging the termination member 42 of the downardly oriented U-shaped central supporting member 15.

FIG. 5, an end view of the implement 5 with the tractor assembly 10 partially broken away, shows an additional implement 154 connected to the draw bar 114 of the tractor 10. Additionally, FIG. 5 shows the cable 72 affixed to the end 116 of the fixed point 110 on the tractor 10. FIG. 5 also shows the three-point hitch 8 having connection points 8a, 8b, rotatably connected to the upper connection plate 36 as well as the lower connection plate 46. FIG. 5 also shows an end 158 of the tine 30 engaging the ground G thereby to eliminate the tracks of the wheel 22 of the tractor 10. As the tractor 10 is turned in a tight radius turn, the implement 154 tends to move toward the side member 37, 40 of the U-shaped downwardly oriented supporting frame 15. With the wings 17, 20 pulled into their substantially vertical positions 17a, 20a, the implement 154 will not engage the wings 17 or 20 thereby permitting the tractor 10 to make a turn which is limited only by the turning capability of the implement 154.

FIG. 6, a partially broken away view of the wing 17 and the central frame member 15, shows the wing 17 having been rotated into its substantial vertical position 17a by the cable 72. The plurality of of tines 30 which are affixed to the wing 17 are no longer engaging the ground and have been pulled out of the way of the implement 154. The means for locking 58 is shown in FIG. 6 as having been pulled upwardly away from the locking block 80 thereby permitting the wing 17 to rotate under the pull of the cable 72 as the three-point hitch is moved to its lowered position.

FIG. 7 shows an alternate embodiment of my invention with a central U-shaped downwardly oriented frame member 200 affixed to the three-point hitch 8 of the tractor 10. In the embodiment of FIG. 7 the side member 204 has a termination member 206 which is formed with a rotary pin 210. The member 206 has a hollow cavity 214 wherein an end 216 of the wing member 218 is rotatably affixed to the pin 210. In the embodiment of FIG. 7 the wing 218 is directly in line with the U-shaped downwardly extending member 200 and is not offset as was the case in the embodiment of FIG. 2. The embodiment of FIG. 7 permits more efficient use of the forces exerted by the cable 220 for the purpose of rotating the wing 218 vertically. A set of three pulleys 222, 224, 226, guides the cable 220. The cable 220 has an end 230 which is attached to the end 116 of the member 110 attached to the draw bar 114 of the tractor 10. Except for the change and orientation of the wing 218 with respect to the central U-shaped supporting member 200 the embodiment of FIG. 7 functions the same way as the previous embodiment does.

FIGS. 8 and 9 show a second alternate embodiment of my invention wherein a two-part rigid bar having parts 300, 302 which are joined at a pivot point 306 is used to rotate a wing 310 vertically with respect to a central downwardly oriented U-shaped supporting member 314. A second end 316 of the bar 302 is pivotably attached at a pivot point 318 to a fixed flange 320 which is attached to a horizontal member 324 rigidly attached to the draw bar 114 of the tractor 10.

As the three-point hitch 8 of the tractor 10 is raised and lowered, in the embodiment of FIGS. 8 and 9 the two-part rigid bars 300, 302 of which there is one associated with each of the two wings, pull the wing, such as the wing 310 substantially vertical with respect to the previous horizontal position as was the case in the previous embodiments. When the three-point hitch 8 is lowered in the embodiment of FIGS. 8, 9, each wing such as the wing 310, is permitted to return to its substantially horizontal position. In the embodiment of FIGS. 8 and 9, no means for locking is required to hold each wing such as the wing 310 substantially horizontal. The two-part rigid bar 300, 302 functions not only to draw the wing 310 to a substantial vertical position, but also to rigidly hold it in a substantially horizontal position when the three-point hitch 8 has been lowered.

While those skilled in the art might propose various modifications and suggestions, it should be understood that I wish to incorporate within the claims of the patent warranted hereon all such modifications, suggestions or changes as reasonably come within my contribution to the art.

I claim as my invention:

1. In a tractor mountable track removing implement for removing track marks made by the rear wheels of the tractor, the implement has a U-shaped downwardly oriented, central frame member connectable to a hitch at the rear of the tractor, and a plurality of earth scoring wings laterally orientable with respect to the tractor, one-half of the members of the plurality are attached to each side of the central frame member and extend substantially horizontally therefrom so as to be positionable behind the rear wheels of the tractor, each said wing has a plurality of downwardly extending tines attached thereto effective to score the earth and remove the track marks made by the tractor wheels when the central frame member is in a first position, an improvement comprising:

means for pivotably mounting each said wing to the central frame;

first and second means each for rotating a respective one of said wings, each said means for rotating one of said wings has a first and a second end, each said first end is connected to a respective said wing and said second ends of said rotating means are attached fixedly with respect to one another to a connection means which is connectable to a selected region on the tractor to which the implement is connectable;

said means for pivotably mounting and said means for rotating each said wing cooperate so as to pivotably rotate each of the wings to a non-horizontal position from the substantially horizontal position in response to the central frame member being moved, in a first direction, from the first position to a second position;

said means for pivotably mounting and said means for rotating each said wing cooperate so as to permit each of the wings to pivotably rotate and return to the substantially horizontal position from the non-horizontal position in response to the central frame member being moved opposite said first direction from the second position to the first position.

2. The improved implement according to claim 1 including further:

means for locking each said wing into the substantially horizontal position, said means for locking being connected to said means for rotating each said wing so as to automatically unlock the wing in response to the central frame member being moved in said first direction prior to said means for rotating each said wing starting to rotate each of the wings vertically.

3. In a tractor mountable track removing implement with a U-shaped, downwardly oriented central frame member connectable to a three-point hitch at the rear of the tractor, and a plurality of earth scoring, horizontally extending wings, one-half of the plurality of wings being attached to each side of the central frame and extendable laterally with respect to the tractor and substantially horizontally behind the rear wheels of the tractor so as to score the earth and remove the tracks made by the rear tractor wheels when the central frame member is in a first position, an improvement comprising:

a plurality of pin members, one of said pin members is associated with each said wing of the plurality of horizontally extending wings, and is selectively located on the U-shaped central member, a plurality of borings, one of said borings is located adjacent a first end of each of said wings, each of said borings receives a said pin member so as to provide a pivotal mounting for each said wing;

first and second means for pulling, each said means for pulling has a first and a second end, each said means for pulling is connected at a said first end to a selected region on each said wing and said second ends of said means for pulling are fixedly attachable with respect to one another to a selected region on the tractor to which the implement is attachable;

said means for pulling being operative to rotate each said wing into a non-horizontal position from the substantially horizontal position in response to the frame member of the implement being moved in a first direction;

said means for pulling being operative to return each said wing to the substantially horizontal position, from the non-horizontal position in response to the frame member of the implement being moved opposite said first direction to the first position.

4. The improved implement according to claim 3 wherein each said means for pulling comprises:
   a flexible member of a selected weight and strength with a wing attachment means affixed to one end thereof and a tractor connectable means attached to another end.

5. The improved implement according to claim 3 wherein said means for pulling comprises:
   at least one rigid, two-part, elongated member affixed at a first end by a means for connection to a selected point on one of said wings.

6. The improved implement according to claim 3 wherein each said means for pulling comprises:
   a flexible cable having a first region and a second region with said first region being attached by a first means for attaching to the selected region on a selected one of said wings with both of said second regions being fixedly attached with respect to one another to a second means for attaching connectable to the selected region on the tractor to which the implement is attachable;
   each said cable being drawn tight when the frame member is moved in said first direction thereby causing each said wing to pivot upward from the substantially horizontal to the non-horizontal position;
   each said cable permitting each said wing to pivot from the non-horizontal position to the substantially horizontal position in response to the frame member being moved opposite said first direction.

7. The improved implement according to claim 6 including further:
   means for locking, associated with each said wing to lockingly retain each said wing in the substantially horizontal position until said cable connected to said wing is drawn tight thereby unlocking and permitting said wing to be rotated to the non-horizontal position.

8. The improved implement according to claim 3 including further:
   a rigid means for connection attached to said second ends of said means for pulling and connectable to the selected region on the tractor.

9. The improved track removing implement according to claim 1,
   wherein said connection means comprises a rigid elongated member to which said second ends of said means for rotating one of said wings are attached and which is connectable to the selected region on the tractor.

10. The improved implement according to claim 1 wherein:
    each said means for rotating one of said wings includes an essentially non-stretching means for transmitting force, and an attachment means, attached to each said wing adjacent said means for pivotably mounting,
    each said means for transmitting has a first and a second end, each said first end is attached to one of said attachment means, each said second end is connected to said connection means.

11. The improved implement according to claim 10 wherein:
    said essentially non-stretching means for transmitting a force is also flexible.

12. In a track removing implement for loosening and breaking compacted soil behind the wheels of a tractor having a movable hitch, the implement has a U-shaped central frame with a pair of spaced apart, generally vertical sides joined at a top end to an essentially horizontal member, the central frame is connectable to the hitch on the tractor, a first rigid elongated wing is connected to a lower end of one side of the central frame, a second rigid elongated wing is connected to a lower end of the second side of the central frame, the wings are extendable substantially horizontally behind selected wheels of the tractor, the rigid elongated wings each have at least one tine attached thereto, the tines extend vertically downward to engage and score the ground behind the selected wheels when the central frame is in a first position, an improvement comprising:
    first and second pivot means interposed between each said wing and the central frame for pivotably attaching the wings to the sides of the central frame;
    first and second rotating means for rotating said pivotably mounted wings connected to each of the wings,
    each said rotating means has a connection means fixedly connectable, with respect to said other connection means, to the tractor;
    support means for supporting each of the wings at the first, substantially horizontal, ground engaging position,
    the wings are selectively rotatable to a second, non-horizontal, non-ground engaging position in response to selected movement of the central frame away from the first position;
    said pivot means and said rotating means cooperate so as to allow the wings to return to said first, substantially horizontal, position from said second non-ground engaging position in response to opposite movement of the central frame.

13. The improved implement according to claim 12 wherein:
    said pivot means include first and second selectively attached pins and first and second selectively located borings,
    said pins are rotatably received by said borings and rotate in said borings as said rotating means raises or lowers the wings in response to selected movement of the central frame.

14. The improved implement according to claim 12 wherein:
    each said rotating means includes first and second essentially non-stretching means for transmitting a force,
    said first means for transmitting has a first and a second end connected respectively to a first and a second connection means, said first connection means is attached to an end of the first wing adjacent said pivot means, said second connection means is adapted to be connected to the tractor;
    said second means for transmitting has a first and a second end connected respectively to a third connection means and to said second connection means, said third connection means is attached to an end of the second wing adjacent said pivot means.

15. The improved implement according to claim 14 wherein:
    said essentially non-stretching means for transmitting a force are also flexible.

16. The improved implement according to claim 1 wherein:
    said means for rotating is also connected to a selected point on the central frame.

17. In a track removing farm implement with a central frame that has first and second rigid, spaced apart, essentially vertical sides each connected at a top end to an essentially horizontal rigid member and first and second elongated wings, each said wing has a plurality of ground engaging tines attached thereto and each said wing is connected at a first end to a lower end of one of the sides and extends essentially horizontally therefrom, the central frame is attachable to a three-point hitch at the rear of an associated tractor, with the central frame in a first position the wings are extendable from each side of the central frame essentially horizontally so as to be locatable behind the rear wheels of the tractor such that the tines dig into the ground and break up the track marks left in the ground by the rear wheels as the tractor moves, an improvement comprising:

first and second means for pivotably attaching the wings to the frame interposed between the first ends of the first and second wings and the associated lower ends of the first and second sides of the frame;

first and second means for rotating the wings connected between the first and second wings and fixedly connectable with respect to one another to the tractor;

said central frame, said means for pivotably attaching, said means for rotating, and said wings cooperating such that as the central frame is moved in a first direction from the first position, said means for rotating rotates said first and second pivotably mounted wings simultaneously from the essentially horizontal ground engaging position to a non-horizontal, non-ground engaging position, and as the central frame is moved opposite said first direction back to the first position, said means for rotating permit said pivotably mounted wings to simultaneously rotate, under the influence of gravity, from the non-horizontal to the essentially horizontal ground engaging position.

18. The improved implement according to claim 17, wherein said first and second means for rotating the wings are each attached to a rigid connection means and said connection means is attachable to a draw-bar extending from the rear of the tractor.

19. The improved implement according to claim 17, wherein:

said first and second means for pivotably attaching include first and second selectively attached pins and first and second selectively located borings, said pins are rotatably received by said borings and rotate in said borings as said means for rotating raise or lower the wings in response to selected movement of the central frame.

20. The improved implement according to claim 19 wherein:

each said rotating means includes an essentially non-stretching means for transmitting a force connected between the associated one of said wings and said connection means.

21. The improved implement according to claim 20 wherein:

said essentially non-stretching means for transmitting a force are also flexible.

22. In a track removing farm implement with a U-shaped downwardly opening central frame member that has first and second elongated wing members extending laterally and essentially horizontally from first and second lower ends thereof, each said wing members has attached thereto a plurality of downwardly extending tines suitable for engaging and breaking up compacted earth, an improvement comprising:

rigid connection means, first and second means for pivotably attaching the wing members to the frame interposed between the first and second wing members and the first and second lower ends of the central frame member, and first and second means each for rotating one of said wing members, said first and second means for rotating each have a first and a second end, each said means for rotating is connected at said first end by a means for attaching to a respective one of said wing members, and at said second end to said rigid connection means, said central frame member, said wing members, said connection means, said means for pivotably attaching, and said means for rotating so cooperating such that as the central frame member is moved in a first direction with respect to said rigid connection means, each said means for rotating causes the attached pivotably mounted one of said wing members to rotate upwardly from the essentially horizontal position to a non-horizontal position and as the central frame member is moved opposite said first direction with respect to said rigid connection means, each said means for rotating permits the attached pivotably mounted one of said wing members to rotate downwardly from the non-horizontal to the essentially horizontal position.

23. The track removing farm implement according to claim 22 including further:

first and second stop means attached to the first and second lower ends of the downwardly opening central frame member, each said stop means engages an associated pivotably mounted one of said wing members and stops the wing member at the essentially horizontal position.

* * * * *